UNITED STATES PATENT OFFICE.

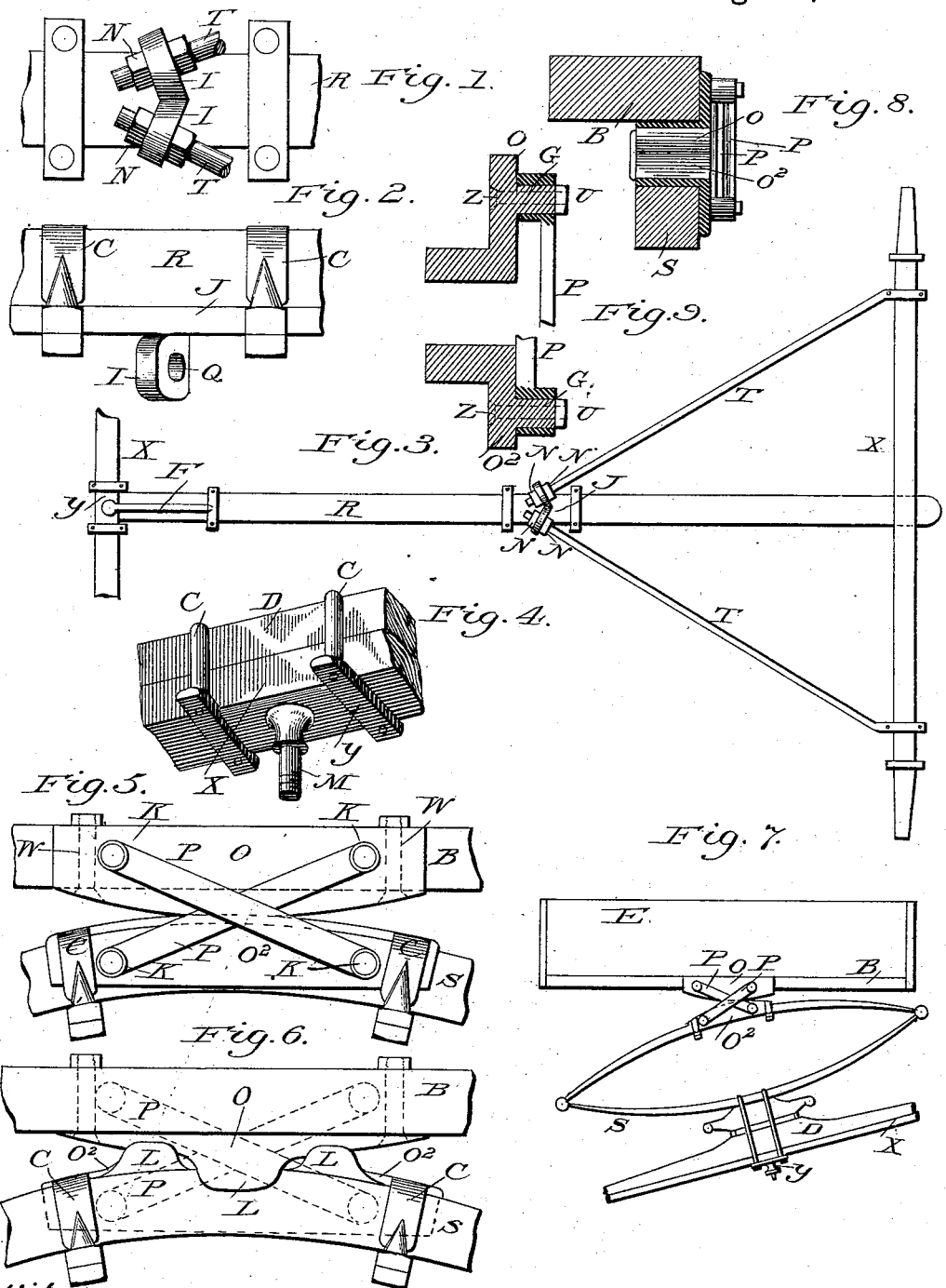

HENRY C. SWAN, OF OSHKOSH, WISCONSIN, ASSIGNOR OF ONE-HALF TO HERBERT M. CLARK, OF SAME PLACE.

SPRING-WAGON.

SPECIFICATION forming part of Letters Patent No. 324,342, dated August 11, 1885.

Application filed May 11, 1885. (No model.)

*To all whom it may concern:*

Be it known that I, HENRY C. SWAN, a citizen of the United States, residing at Oshkosh, county of Winnebago, State of Wisconsin, have invented new and useful Improvements in the Gears of Spring-Wagons; and I do declare that the following specification is a full, clear, and exact description of the same, reference being had to the accompanying drawings, which form a part of the specification.

My invention relates to an oscillating attachment for the front spring and body of spring-wagons, an adjusting-coupling for the reach of spring-wagons, and a double safety-yoke for the front axle of spring-wagons.

Similar letters refer to similar parts throughout the different views.

Figure 1 represents a bottom view of adjusting-coupling, in which R is section of straight reach; J, adjusting-coupling; I I, lips on same; T T, side braces, and N N N N nuts securing side braces to lips I I.

Heretofore the chief difficulty in building spring-wagon gears has been the trouble to bring the rear axle to a perfect square position with the reach and gear. By my improvement (shown fully in Fig. 3) the squaring of the gear is accomplished by simply turning one or more of the four nuts N N N N as the occasion may require, which, drawing the brace and axle, makes a square gear, and then tightening the opposite nuts to hold the brace tight.

Fig. 2 represents a side view of adjusting-coupling, R being section of straight reach; J, adjusting-coupling; I, lip on same; Q, hole in lip, through which passes brace or stay, and C C clips securing adjusting-coupling to reach.

Fig. 3 represents a spring-wagon gear in a horizontal position, R being straight reach; X X, axles; T T, braces or stays; J, adjusting-coupling; N N N N, nuts; Y, safety double yoke, and F safety-stay. The purpose of this double safety-yoke is to securely hold the front axle in place by means of safety-stay, and yet allow the axle to move freely in turning on the center bolt or king-bolt.

Heretofore all yokes of this nature have been single, being fastened by one clip over axle and running through hole in yoke on each side of axle. This is a very frail fastening and often works loose by the constant turning strain to which the yoke is subject by the axle twisting on center bolt. I overcome this weak point by making my yoke with double ends, fastened by two clips over axle and passing through holes in yoke at each end, thus doubly securing it to axle.

Fig. 4 shows a perspective view of double safety-yoke, Y being yoke; X, axle; D, axle-bed; C C, clips fastening yoke to axle, and M prong on yoke to receive safety stay.

Fig. 5 represents a rear view of my improvement in an oscillating attachment for the front spring and body of spring-wagons, the object of which is to allow the wagon gear and spring to turn and twist freely under the body, and not strain or damage the body by said twisting and turning. My improvement consists of two convex pieces of metal resting on each other and secured in place by crossing arms and projecting lips.

In Fig. 5, O is top part of oscillator fastened to body-sill B by bolts W W. $O^2$ is lower portion of oscillator fastened to front spring, S, by clips C C. P P are arms crossing each other and secured to oscillators at points K K K K.

Fig. 6 is a front view of oscillator, O being top part; $O^2$, bottom part; P P, crossing arms; C C clips; S, spring; B, body-sill; L L L, lips projecting from each part of oscillator to prevent sliding over each other.

Fig. 7 shows oscillator attached to a wagon and the axle and spring of same wagon being in a crooked position, and yet allowing body to remain level, thus showing the advantage of my oscillator. E is body; B, body-sill; S, spring; X, axle; D, axle-bed; Y, safety-yoke; O, top part of oscillator; $O^2$, bottom part of oscillator; P P, crossing arms.

It will be readily seen by reference to Fig. 7 that in the operation of my invention, when the front spring, S, rolls, by reason of the axle X pitching up or down when going over uneven roads, the convex surfaces of the oscillator move on each other, always affording a steady support for the body of wagon, and yet allowing said body to remain on a level. The two crossing arms P P are fastened to oscillator by means of devices shown in Fig. 9, which is a cross-section of the oscillators, showing the supporting-nibs, in which O and O² are end views of the two parts of oscillator, G G being round nibs or bosses made solid on oscillator parts, P P being crossing arms in sections fitting over nibs G G, and held in place by bolts Z Z and nuts U U. In order to allow arms P P to cross each other I reverse them, placing one closely against oscillator, and the other allowing only the projecting end to rest against oscillator, thus letting them pass by each other, and yet being well attached to the nibs or projections of oscillator.

Fig. 8 represents an end view of oscillator, B being body-sill; O, oscillator top; O², oscillator bottom; S, spring, and P P crossing arms.

I am well aware that several oscillators have been made before, but claim originality in the form of this one, the two convex surfaces rolling on each other and secured by crossing arms. I also claim greater durability and less liability to rattle in this oscillator over the common pivotal form, for by the peculiar construction of mine the two convex surfaces present a wearing-face of several inches, and, changing faces as they roll present new surfaces, and necessarily will wear much longer.

Having now described my several inventions, what I claim as new, and for which I desire to secure Letters Patent, is—

1. The reach-coupling J, having the projecting lips I, in combination with the brace T, adjustable in said lips by means of nuts N.

2. The oscillator-plates O O², for attaching the front end of the wagon-body to the running-gear, having convex surfaces for rolling one upon the other and connected by the diagonally arranged arms P, pivotally connected to the opposite sides of the oscillating plates.

In witness whereof I hereunto set my hand this 7th day of May, A. D. 1885.

HENRY C. SWAN.

Witnesses:
F. C. STEWART,
O. C. WEISBROD.